Figure 1:
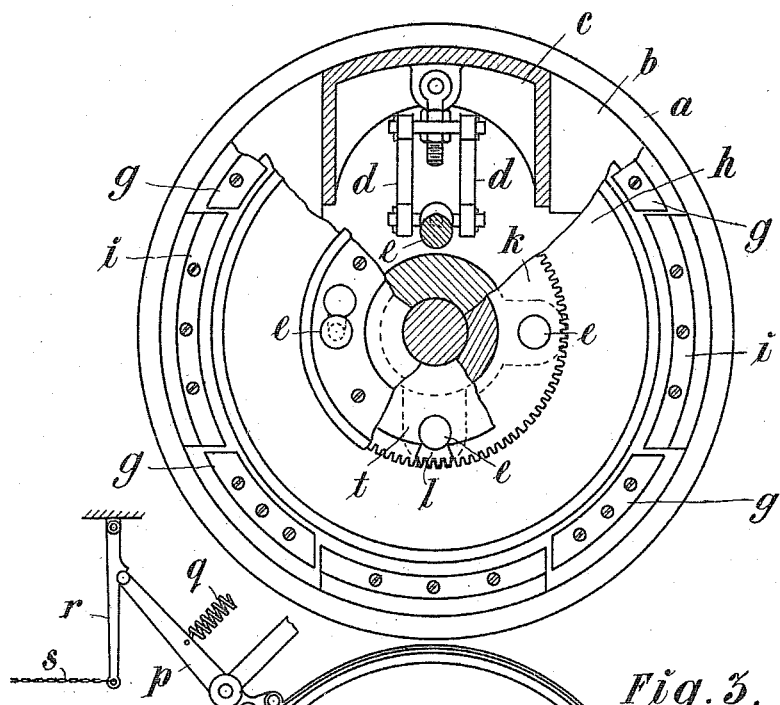

C. HENRIKSSON.
SHAFT COUPLING.
APPLICATION FILED AUG. 26, 1910.

985,742.

Patented Feb. 28, 1911.
2 SHEETS—SHEET 1.

Witnesses

Inventor
Carl Henriksson

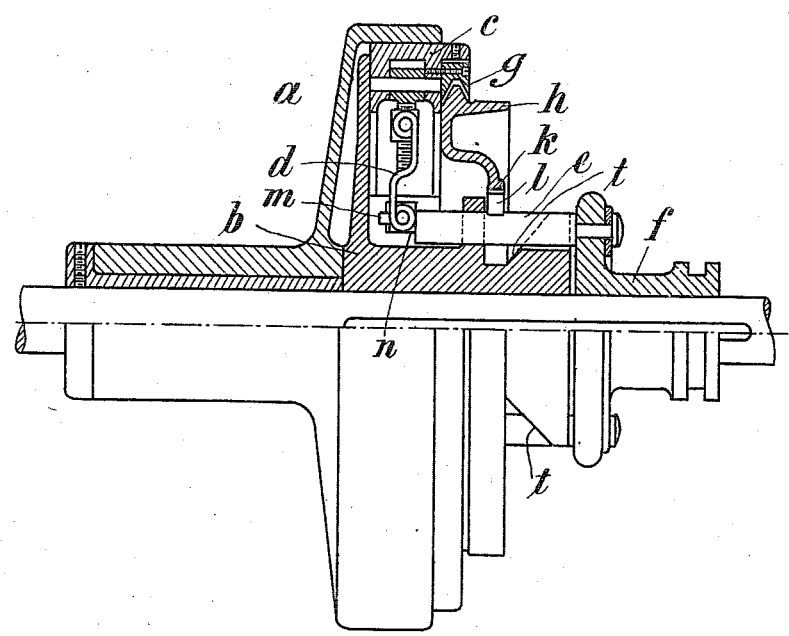

UNITED STATES PATENT OFFICE.

CARL HENRIKSSON, OF SKÄRSÄTTRA, SWEDEN, ASSIGNOR TO CARL JAKOB LUNDSTRÖM, OF STOCKHOLM, SWEDEN.

SHAFT-COUPLING.

985,742.

Specification of Letters Patent. Patented Feb. 28, 1911.

Application filed August 26, 1910. Serial No. 579,164.

*To all whom it may concern:*

Be it known that I, CARL HENRIKSSON, a subject of the King of Sweden, residing at Skärsättra, in the Kingdom of Sweden, have invented new and useful Improvements in Shaft-Couplings, of which the following is a specification, reference being had to the drawings accompanying and forming a part hereof.

This invention relates to couplings for pulleys, shafts and like which are adapted to be used either as a clutch for connecting or disconnecting two shafts or the like by hand or for disconnecting the shafts automatically in case of accident.

The object of the invention is to provide a combined clutch and safety uncoupling device of the said kind which is simple in construction and reliable in working.

The invention consists, chiefly, in the connection between a brake and the friction blocks being formed by pins or the like adapted to be turned and moved longitudinally, said pins being connected to the brake so as to be turned when the said brake is applied and connected to the friction blocks in such a manner that the latter will be thrown out of engagement when the pins are either turned or moved longitudinally.

The invention further comprises the construction and combination of parts hereinafter described.

In the drawings, I have shown a shaft-coupling embodying the invention.

Figure 3:
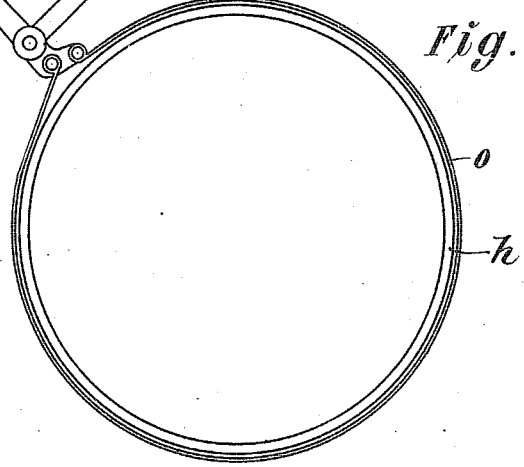

Figure 1 is an end-view and partial section of the coupling viewed in the longitudinal direction of the shaft. Fig. 2 is an elevation and partial longitudinal section of the same coupling. Fig. 3 is a diagrammatic view illustrating the strap brake and the tripping device for applying same to the disk $h$.

Referring to the drawings, the clutch is shown as a friction clutch, $a$ being the driving and $b$ the driven clutch member. The friction blocks $c$ are placed in the latter in such a manner as to be movable radially, said blocks being connected by links $d$, $d$ to axles or pins $e$ connected to a sleeve $f$ adapted to be moved along the shaft by means of a lever or otherwise.

Attached to the driven clutch member $b$ at or near the circumference thereof are friction members $g$ (Fig. 1) bearing loosely on the outer edge of a disk $h$ in such a manner that the latter is normally caused to move with the friction members. If the disk $h$ is checked or stopped, the friction members $g$ of the clutch member $b$ continue to move along the circumference of the disk $h$.

Attached to the members $c$ are friction jaws $i$ extending past the outer edge of the disk $h$ without engaging same. The inner edge of the disk $h$ forms a cog-wheel engaging cog segments $l$ on the pins $e$ when the clutch is operative. Projecting from the inner ends of the pins $e$ are eccentric pivots $m$ carrying blocks $n$ engaging the links $d$.

The brake acting on the disk $h$ suitably consists of a band $o$ adapted to be tightened by means of a lever $p$. The tightening of the band is effected by a spring $q$ placed between the lever $p$ and a stationary part. During normal running the lever $p$ is retained by an arm or lever $r$ in the position shown in Fig. 3. When a pull is exerted on the string or cord $s$, the arm $r$ is turned (toward the left in Fig. 3) so that the lever $p$ is disengaged and turned by the action of the spring $q$.

The mechanism described works as follows: When the lever $p$ is released, the brake band $o$ is tightened about the disk $h$ which is thereby checked or stopped. On account thereof, the cog segments $l$ and the pins $e$, which partake in the movement of the driven member, are turned, by which the pivots $m$ are swung inwardly, acting through the links $d$ to throw the friction blocks $c$ out of engagement with the driving member $b$. At the same time the jaws $i$ are pressed against the circumference of the disk $h$, and as the latter is retained by the brake band $o$ the driven member $b$ is rapidly stopped. When the member $b$ is to be started, the lever $p$ is tripped, whereupon the sleeve $f$ is moved on the shaft (toward the right in Fig. 2). During this movement the cog segments $l$, which have been swung into a position in which they are out of engagement with the disk $h$, meet the oblique surfaces t of the member b, by which the cog segments are swung back into their former positions. When the sleeve f is moved back, the cog segments l, therefore, engage the cogwheel k. In order to facilitate this reëngagement, the cogs of the wheel k as well as those of the sectors l are tapered at the ends thereof adjacent to each other so that the cogs will easily enter into engagement.

I claim:

1. In an automatic safety coupling, the combination of a pair of clutch members, friction blocks carried by one of the said clutch members in such a position as to normally engage the other clutch member, a brake one member of which is carried by one of the clutch members and adapted to rotate therewith, pins carried by the said clutch member in such a manner as to be capable of turning as well as of longitudinal movement, connections between the rotary member of the brake and the said pins for turning the latter when the brake is applied, and connections between the said pins and the friction blocks for disengaging the latter when the pins are turned or moved longitudinally.

2. In an automatic safety coupling, the combination of a driving clutch member, a driven clutch member, friction blocks carried by one of the said clutch members in such a position as to normally engage the other clutch member, a brake one member of which forms a disk adapted to rotate with the driven clutch member, pins carried by the said clutch member in such a manner as to be capable of turning as well as of longitudinal movement, connections between the rotary member of the brake and the said pins for turning the latter when the brake is applied, and connections between the said pins and the friction blocks for disengaging the latter when the pins are turned or moved longitudinally.

3. In an automatic safety coupling, the combination of a driving clutch member, a driven clutch member, friction blocks carried by one of the said clutch members in such a position as to normally engage the other clutch member, a brake one member of which forms a friction disk adapted to rotate with the driven clutch member and having cogs at its central part, pins carried by the said clutch member in such a manner as to be capable of turning as well as of longitudinal movement, cog segments carried by the said pins and adapted to engage the cogs of the friction disk, and connections between the said pins and the friction blocks for disengaging the latter when the pins are turned or moved longitudinally.

4. In an automatic safety coupling, the combination of a pair of clutch members, friction blocks carried by one of the said clutch members in such a position as to normally engage the other clutch member, a brake one member of which is carried by one of the clutch members and adapted to rotate therewith, a sleeve adapted to be moved along the shaft of the coupling, pins connected to the said sleeve in such a manner as to be capable of turning about their axes, connections between the rotary member of the brake and the said pins for turning the latter when the brake is applied, and connections between the said pins and the friction blocks for disengaging the latter when the pins are turned or moved longitudinally.

5. In an automatic safety coupling, the combination of a driving clutch member, a driven clutch member, friction blocks carried by one of the said clutch members in such a position as to normally engage the other clutch member, a brake one member of which forms a friction disk adapted to rotate with the driven clutch member and having cogs at its central part, a sleeve adapted to be moved along the shaft of the coupling, pins connected to the said sleeve in such a manner as to be capable of turning about their axes, cog segments thereon adapted to engage the cogs of the friction disk, connections between the said pins and the friction blocks for disengaging the latter when the pins are turned or moved longitudinally, and abutments acting on the cog segments, when the sleeve is moved in one direction, so as to turn the pins into positions in which the cog segments are ready to reëngage the friction disk.

6. In an automatic safety coupling, the combination of a pair of clutch members, friction blocks carried by one of the said clutch members in such a position as to normally engage the other clutch member, friction jaws carried by the said blocks, a brake one member of which is carried by one of the clutch members and adapted to rotate therewith, said member of the brake being adapted to be engaged by the friction jaws when the friction blocks are thrown out of engagement with the coöperating clutch member, pins carried by the other clutch member in such a manner as to be capable of turning as well as of longitudinal movement, connections between the rotary member of the brake and the said pins for turning the latter when the brake is applied, and connections between the said pins and the friction blocks for disengaging the latter when the pins are turned or moved longitudinally.

7. In an automatic safety coupling, the combination of a pair of clutch members, friction blocks carried by one of the said clutch members in such a position as to normally engage the other clutch member, a brake one member of which is carried by one of the clutch members and adapted to rotate therewith, pins carried by the said clutch member in such a manner as to be capable of turning as well as of longitudinal movement, connections between the rotary member of the brake and the said pins for turning the latter when the brake is applied, connections between the said pins and the friction blocks for disengaging the latter when the pins are turned or moved longitudinally, and a tripping device for applying the brake in case of accident.

CARL HENRIKSSON.

Witnesses:
AUG. SÖRENSEN,
K. E. WIBERG.

Copies of this patent may be obtained for five cents each, by addressing the "Commissioner of Patents, Washington, D. C."